(12) United States Patent
Lo

(10) Patent No.: US 7,029,233 B2
(45) Date of Patent: Apr. 18, 2006

(54) MODULATOR WATER DYNAMOMETER

(75) Inventor: Charles S. Lo, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 143 days.

(21) Appl. No.: 10/832,932

(22) Filed: Apr. 26, 2004

(65) Prior Publication Data

US 2005/0235760 A1 Oct. 27, 2005

(51) Int. Cl.
*F04D 29/44* (2006.01)

(52) U.S. Cl. .............. 415/199.4; 415/199.6; 73/862.14

(58) Field of Classification Search .......... 415/199.4, 415/199.5, 199.6, 116; 416/91; 73/862.11, 73/862.14

See application file for complete search history.

(56) References Cited

U.S. PATENT DOCUMENTS

| | | | |
|---|---|---|---|
| 3,598,208 A | * | 8/1971 | Bronder ................ 188/290 |
| 4,272,131 A | | 6/1981 | Termont |
| 4,480,728 A | | 11/1984 | Bailey et al. |
| 4,711,328 A | | 12/1987 | Bazilio et al. |
| 4,864,872 A | | 9/1989 | Stahl |
| 4,881,625 A | | 11/1989 | Redelman |
| 4,899,595 A | | 2/1990 | Warsaw |
| 5,573,088 A | | 11/1996 | Daniels |

* cited by examiner

*Primary Examiner*—Edward K. Look
*Assistant Examiner*—Dwayne J White
(74) *Attorney, Agent, or Firm*—Ingrassia Fisher & Lorenz

(57) ABSTRACT

A modular waterbrake that can be used with differing types and sizes of rotating machines includes common end stages, and a plurality of common intervening power stages. Each power stage will extract a certain amount of shaft horsepower from the machine under test, and each stage operates independently of one another. Thus, the modular water dynamometer can be used to zero in on desired torque test loads during machine testing, by simply activating or deactivating selected stages.

42 Claims, 13 Drawing Sheets

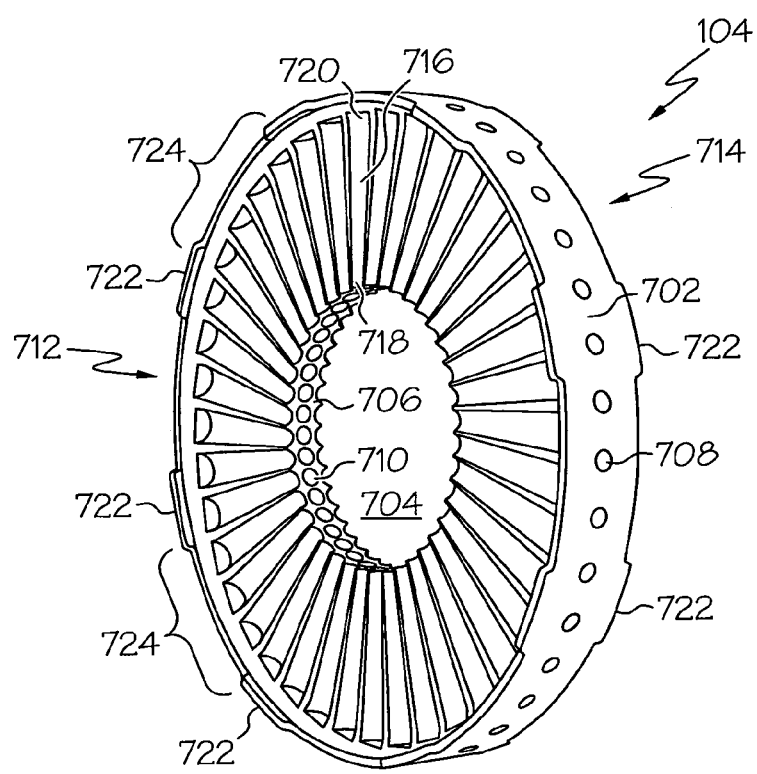
FIG. 7
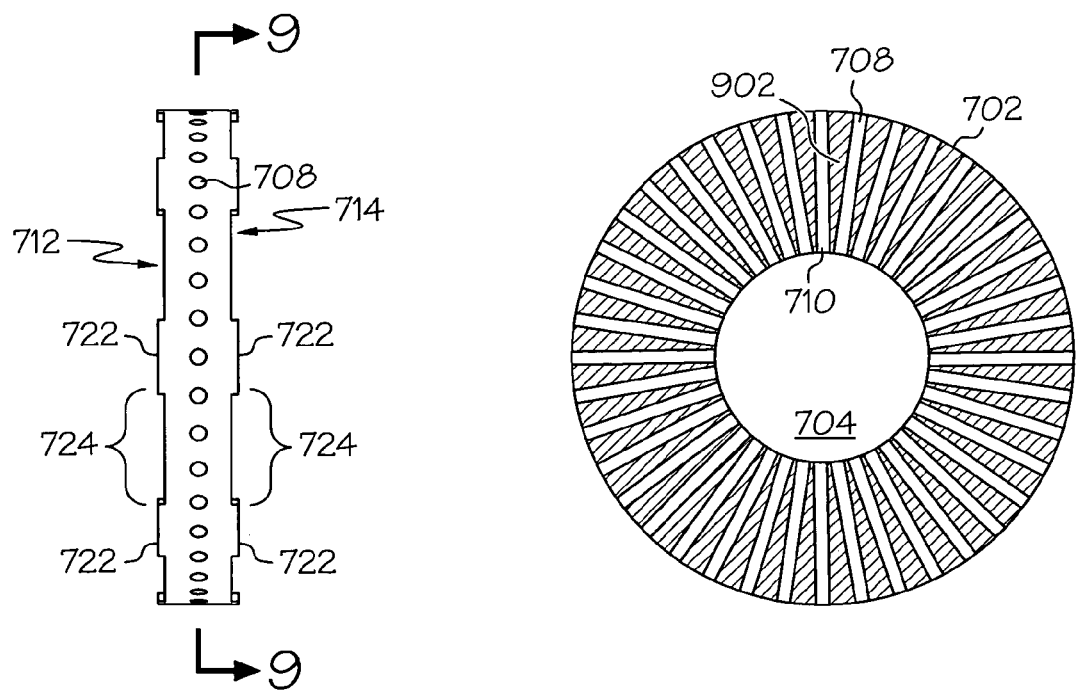
FIG. 8
FIG. 9

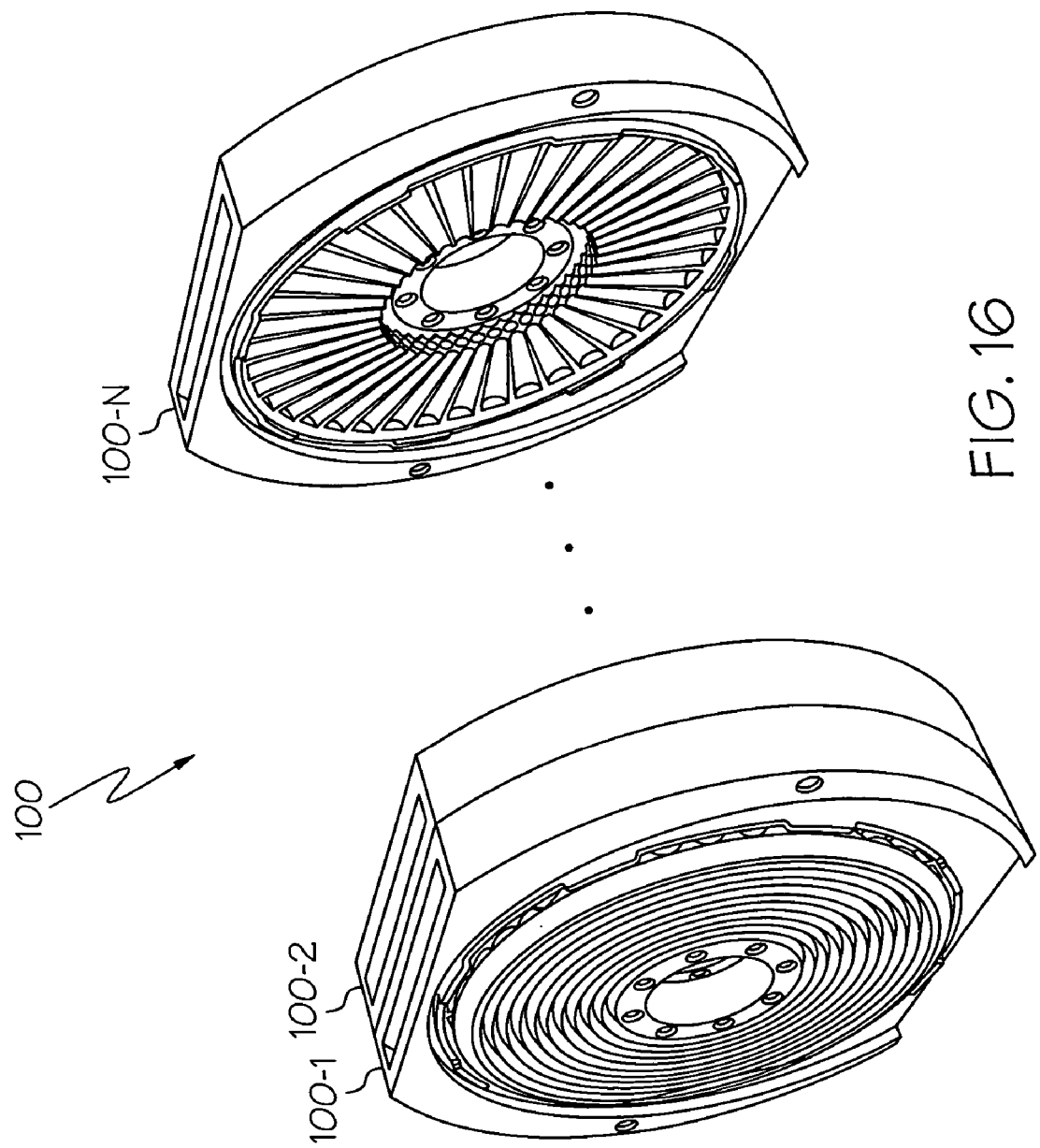

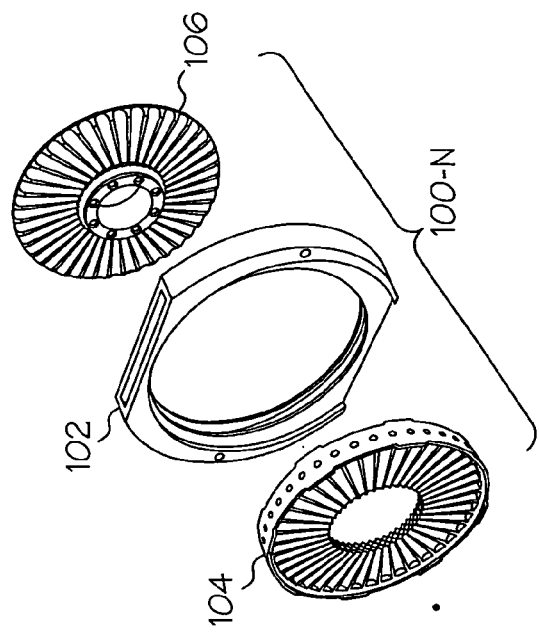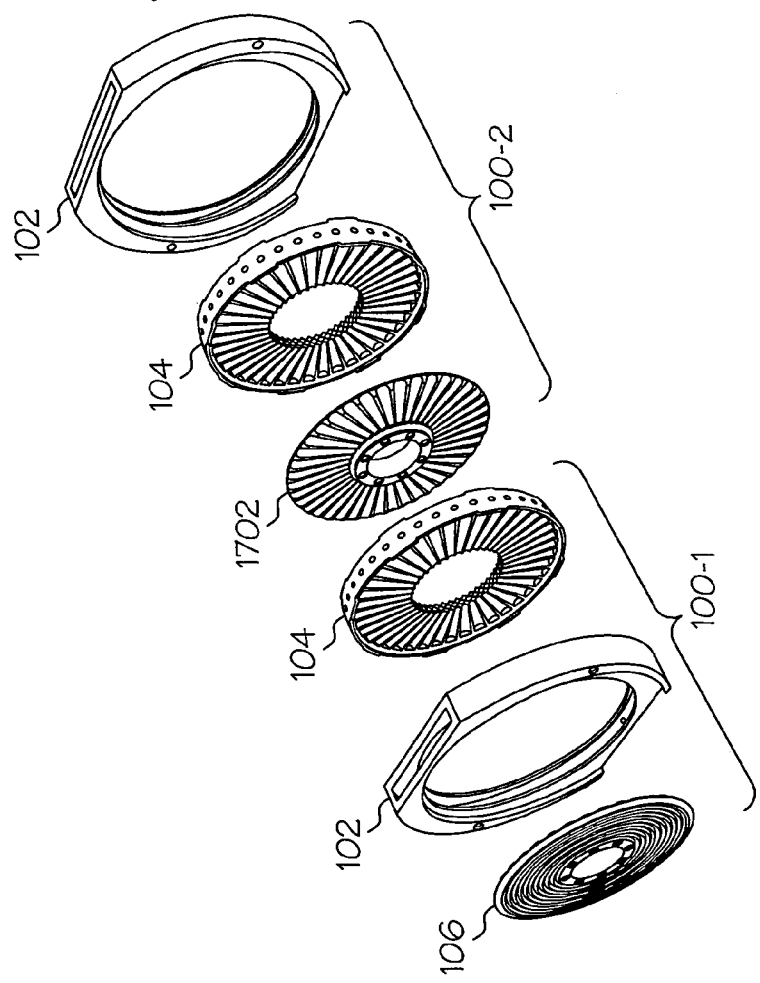
FIG. 17

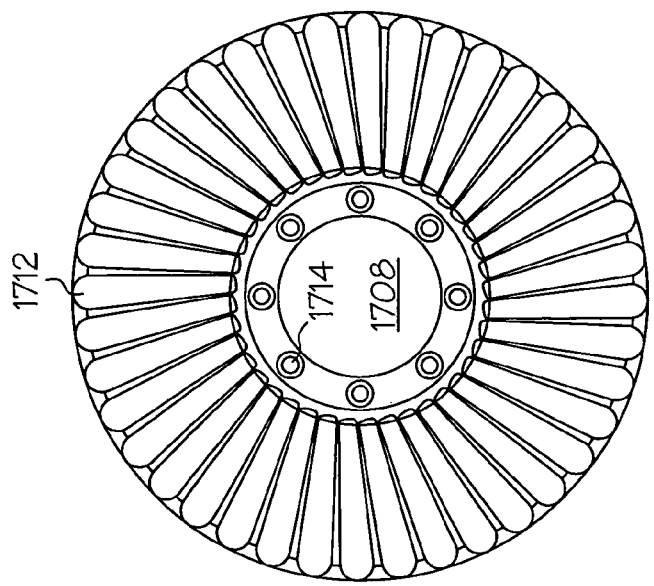
FIG. 19
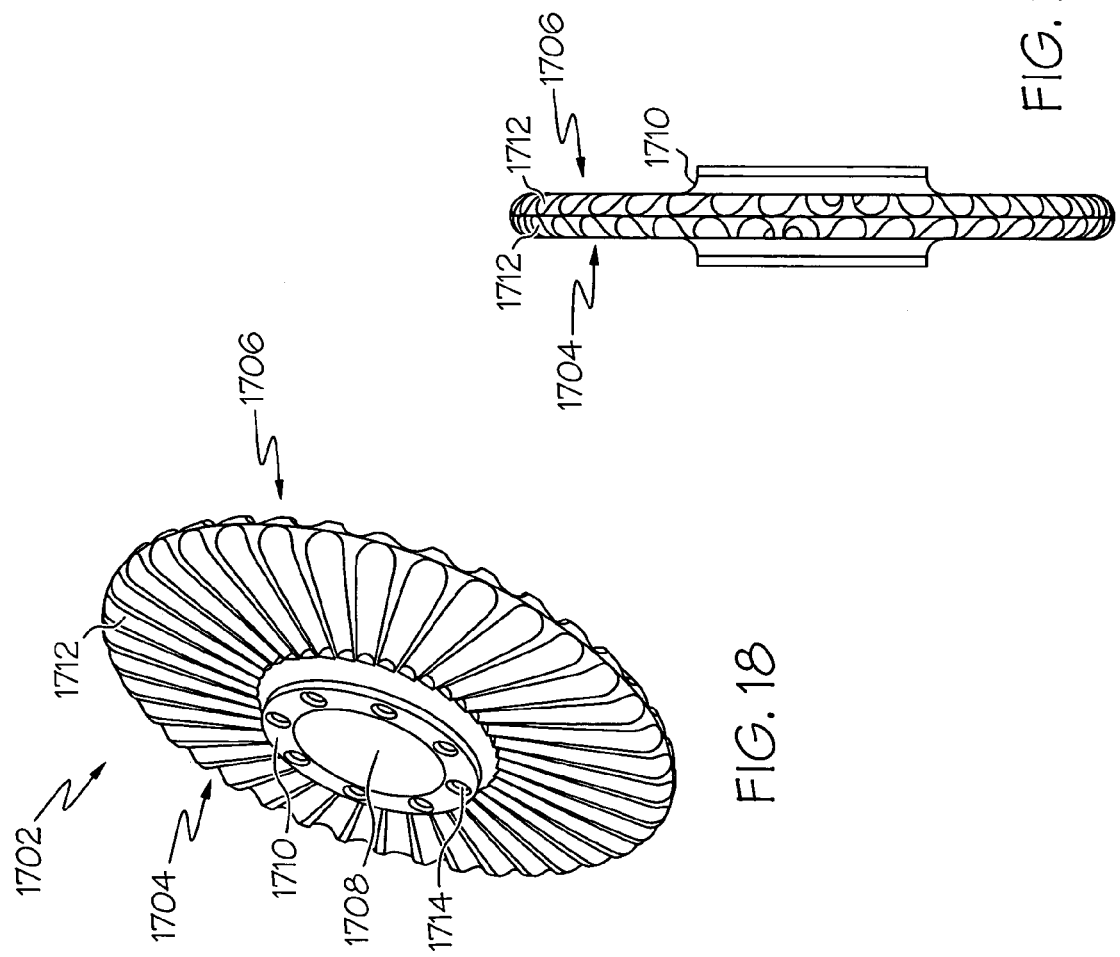
FIG. 20
FIG. 18

MODULATOR WATER DYNAMOMETER

FIELD OF THE INVENTION

The present invention relates to water dynamometer systems and, more particularly, to a modular water dynamometer that may be used to test rotating machines of various types and sizes.

BACKGROUND OF THE INVENTION

Dynamometers are devices that are used to measure power, force, or energy. One particular type of dynamometer is known as a waterbrake. A waterbrake may be used to test various rotating machines such as engines and motors. In particular, a waterbrake may be used to measure, for example, the horsepower generated by a rotating machine, such as an engine or motor.

A waterbrake typically be coupled to a fluid system. The waterbrake generally includes a rotor that is rotationally mounted within a housing. The housing includes fluid inlet and outlet ports coupled to the fluid system, which allows fluid, such as water, to flow into and out of the waterbrake housing. During use, the output shaft of the rotating machine under test may drive the waterbrake rotor. Fluid within the waterbrake applies a load to the waterbrake rotor, and thus to the rotating machine output shaft. The reaction torque generated by the output shaft may be measured and used to determine the output power of the rotating machine.

It is generally known that different types of rotating machines may differ in size, speed, and horsepower. As such, different sizes of waterbrakes may also be needed to tests different types of rotating machines. Although the use of differing and multiple waterbrakes works well, it does suffer certain drawbacks. For example, using differing and/or multiple waterbrakes can increase overall test system inventory, overall complexity, and overall costs.

Hence, there is a need for a waterbrake that can be used with differing types and sizes of rotating machines, to thereby reduce overall test system inventor, and/or complexity, and/or costs. The present invention addresses one or more of these needs.

SUMMARY OF THE INVENTION

The present invention provides a modular waterbrake that can be used with differing types and sizes of rotating machines.

In one embodiment, and by way of example only, a water dynamometer includes a channel housing, a stator ring, and first and second end rotors. The channel housing has a fluid inlet port, a fluid outlet port, and a flow channel formed therein that fluidly couples the fluid inlet port to the fluid outlet port. The stator ring is disposed at least partially within the channel housing and has a first side, a second side, an outer peripheral surface, and an inner peripheral surface. The stator ring outer peripheral surface has a plurality of fluid inlet ports in fluid communication with the channel housing flow channel, and the stator ring inner peripheral surface has a plurality of fluid outlet ports in fluid communication with the fluid inlet ports of the stator ring outer peripheral surface. The first end rotor and the second end rotor are disposed adjacent the stator ring first side and second side, respectively. Each end rotor includes a plurality of rotor vanes disposed on a surface thereof that are in fluid communication with the fluid outlet ports of the stator ring inner peripheral surface.

In another exemplary embodiment, a modular water dynamometer includes two or more channel housings, two or more stator rings, one or more intermediate rotors, a first end rotor, and a second end rotor. The channel housings are coupled together and each have a fluid inlet port, a fluid outlet port, and a flow channel formed therein that fluidly couples its associated fluid inlet port to its associated fluid outlet port. Each stator ring is disposed at least partially within at least one of the channel housings and has a first side, a second side, an outer peripheral surface, and an inner peripheral surface. The outer peripheral surface of each stator ring has a plurality of fluid inlet ports in fluid communication with its associated channel housing flow channel, and the inner peripheral surface of each stator ring has a plurality of fluid outlet ports in fluid communication with the fluid inlet ports of its associated stator ring outer peripheral. Each intermediate rotor is disposed between two stator rings. The first end rotor is disposed adjacent the first side of a first one of the stator rings, and the second end rotor is disposed adjacent the second side of a second one of the stator rings.

Other independent features and advantages of the preferred modular water dynamometer will become apparent from the following detailed description, taken in conjunction with the accompanying drawings which illustrate, by way of example, the principles of the invention.

BRIEF DESCRIPTION OF THE DRAWINGS

FIGS. 7 and 8 are perspective and side views, respectively, of a stator ring that is used to implement the exemplary water dynamometer of FIGS. 1 and 2;

FIG. 9 is a cross section view of the stator ring taken along line 9—9 in FIG. 8;

FIGS. 16 and 17 are perspective and exploded views, respectively, of an exemplary modular water dynamometer configured in a multi-stage implementation; and FIGS. 18–20 are perspective, front, and side views, respectively, of an exemplary intermediate rotor that may be used to implement the exemplary multi-stage dynamometer of FIGS. 16 and 17;

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background of the invention or the following detailed description of the invention.

Figure 1:
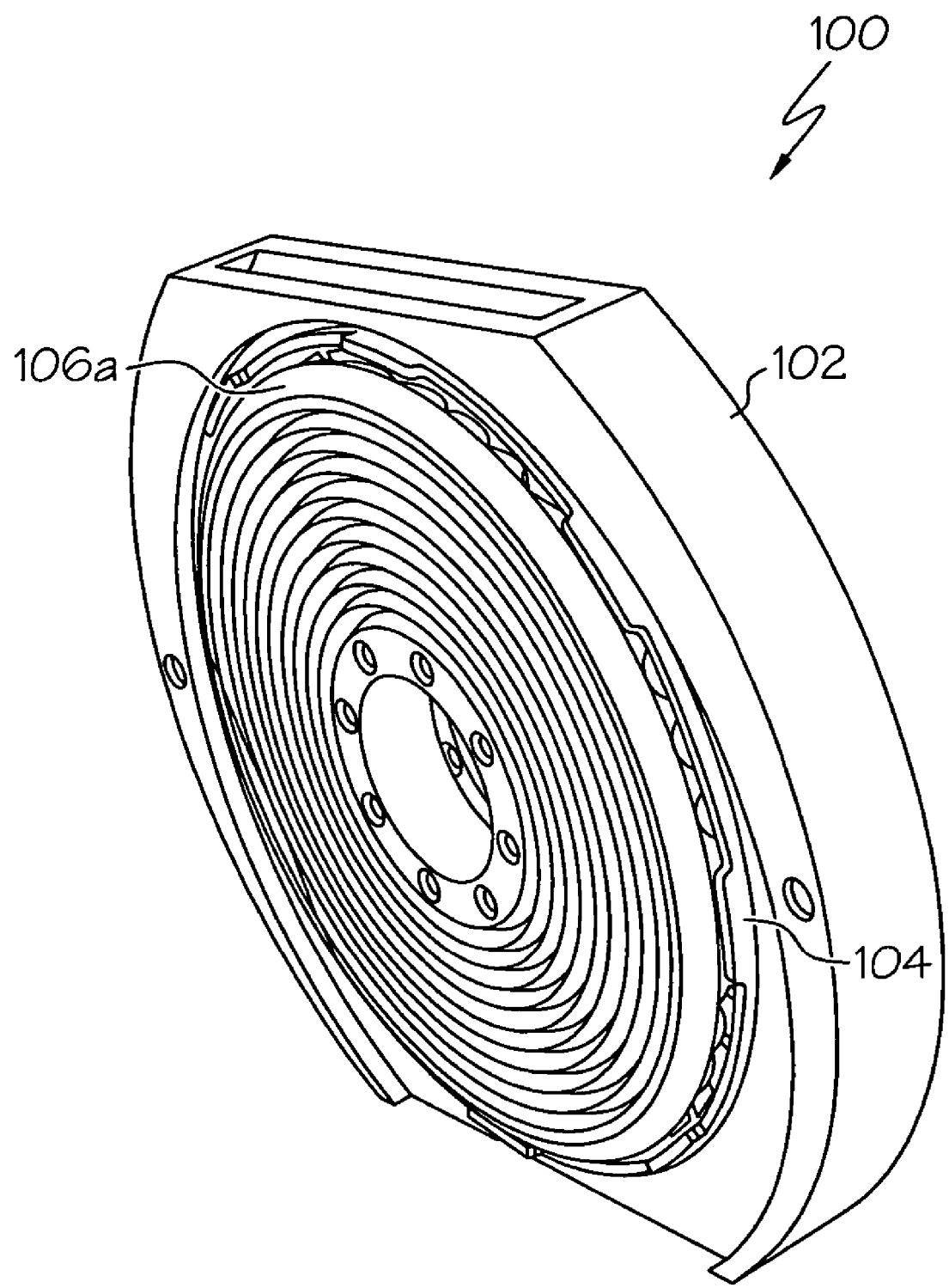
FIG. 1 is a perspective view of an exemplary embodiment of a modular water dynamometer of the present invention that is configured to include a single modular stage.
Figure 2:
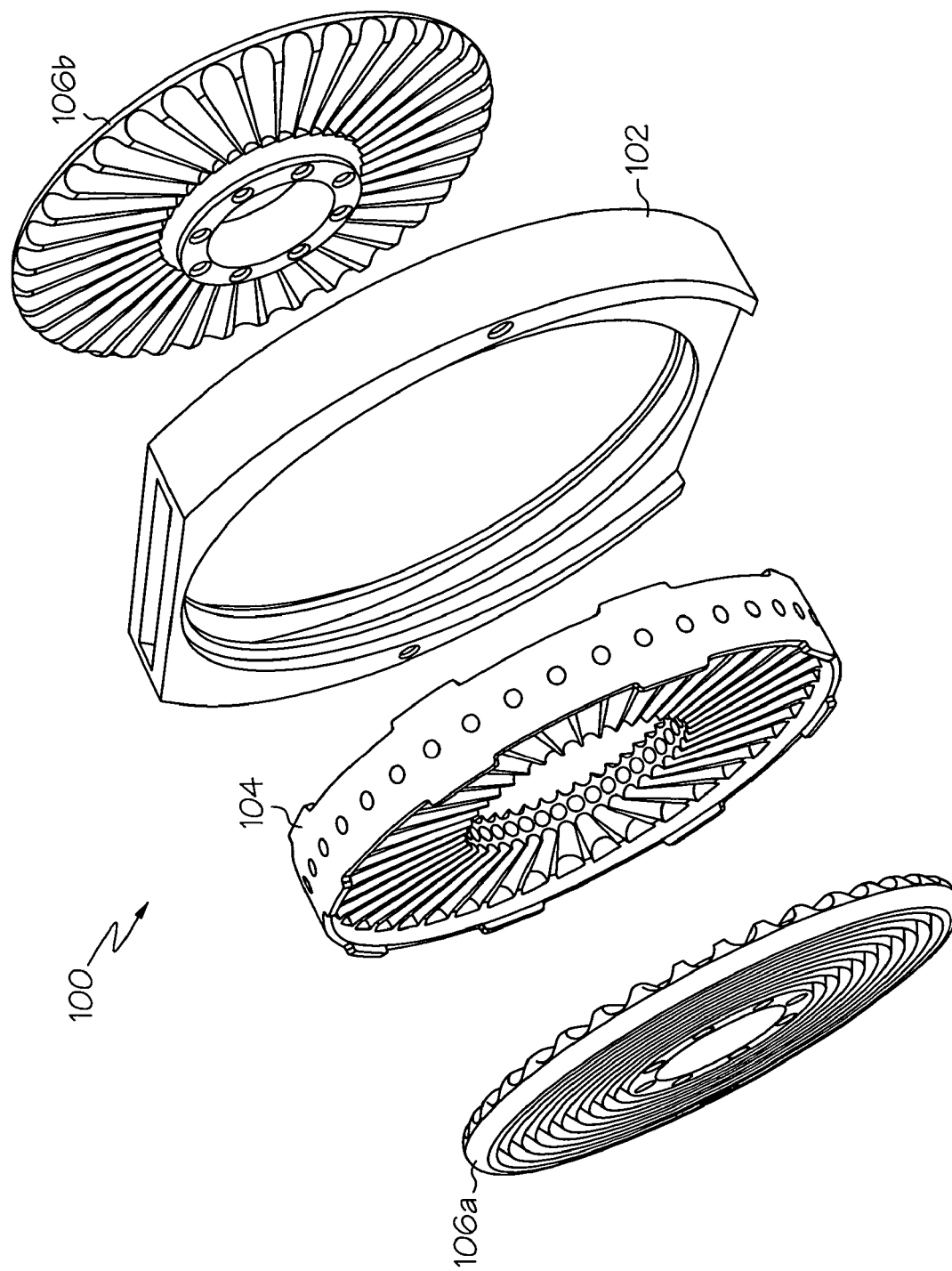
FIG. 2 is an exploded view of the modular water dynamometer shown in FIG. 1.

Turning now to the description, and with reference first to FIGS. 1 and 2, perspective and exploded views of an exemplary embodiment of a modular water dynamometer is shown. In the embodiment depicted in FIGS. 1 and 2, the modular water dynamometer 100 is configured in a single-stage implementation. As will be described more fully further below, the modular water dynamometer 100 may be configured in a multi-stage (e.g., N-stage) implementation. It will be appreciated that the number of stages (N) for a particular implementation is preferably selected to provide the desired load characteristics for the machine being tested. As will also be described more fully further below, even if the modular water dynamometer 100 is configured in an N-stage implementation, selected ones of the N-stages may be selectively activated or deactivated to provide the desired load characteristics.

Figure 3:
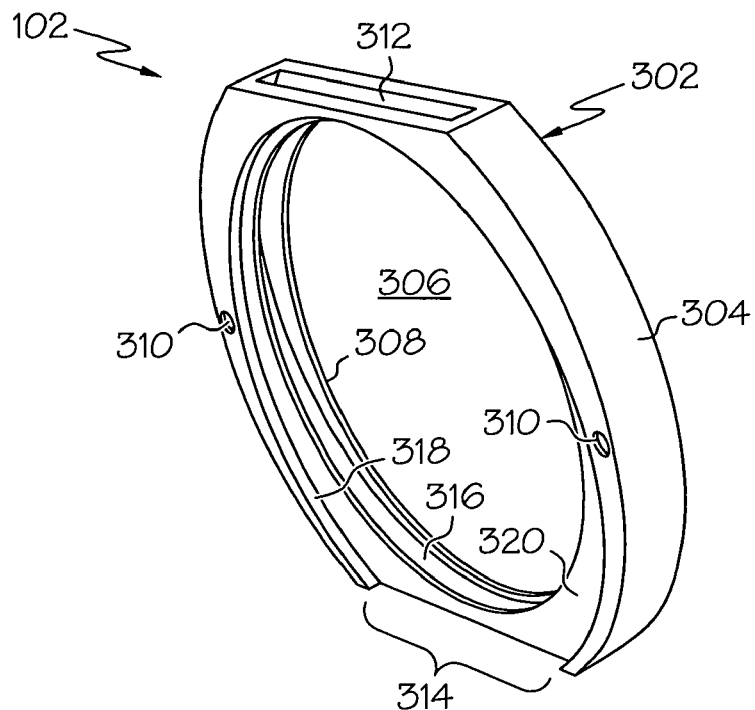
FIGS. 3 and 4 are perspective top and bottom views of a channel housing that is used to implement the exemplary modular water dynamometer of FIGS. 1 and 2.
Figure 4:
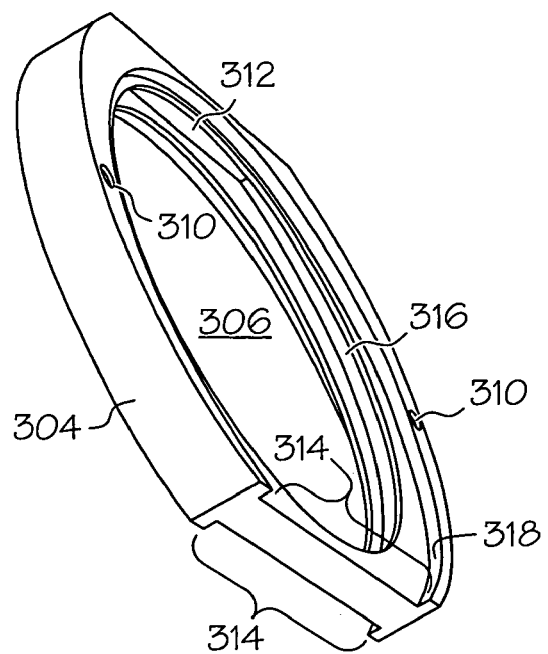
Figure 5:
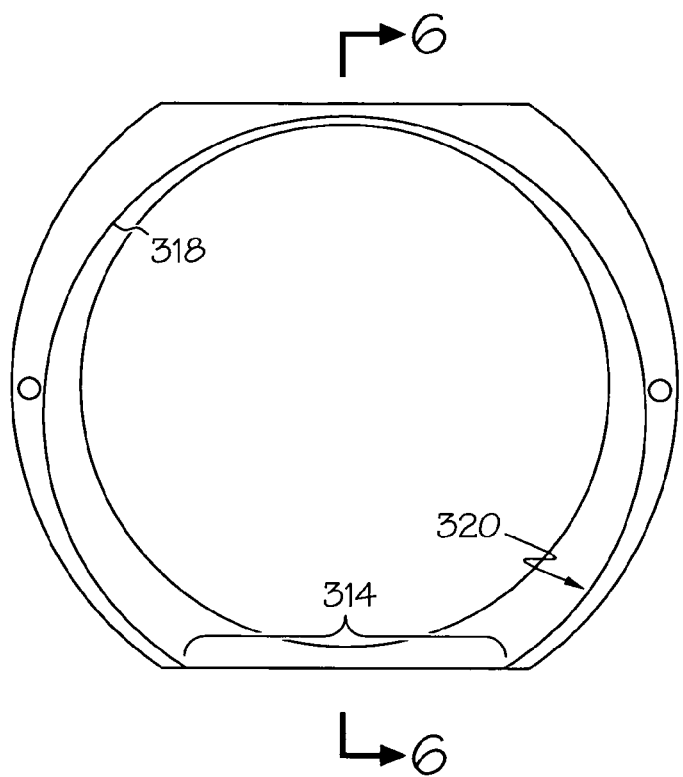
FIG. 5 is a front view of the channel housing of FIGS. 3 and 4.
Figure 6:
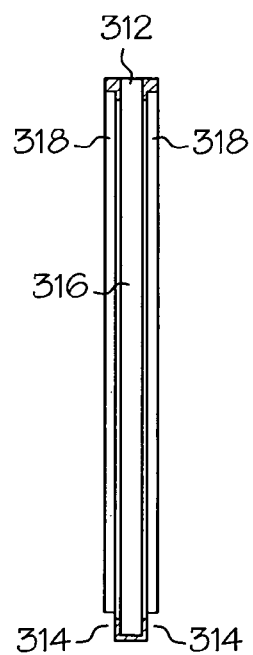
FIG. 6 is a cross section view of the channel housing taken along line 6—6 in FIG. 5.

Returning now to the description of the single-stage embodiment, it is seen that the modular water dynamometer 100 includes a channel housing 102, a stator ring 104, and two end rotors 106 (106a, 106b). The channel housing 102, which is shown more clearly in FIGS. 3–7, includes a main body 302 having an outer peripheral surface 304, and an opening 306 through the main body 302 that forms an inner peripheral surface 308. The channel housing 102 is used to house at least portions of the stator ring 104 and/or the end rotors 106. Indeed, with quick reference back to FIG. 1, it is seen that the stator ring 104 and portions of the end rotors 106 are at least partially disposed within, and surrounded by, the opening 306. Returning once again to FIG. 3, it is further seen that the channel housing 102 additionally includes a plurality of openings 310 that extend through the main body 302. These openings 310 are each configured to receive a fastener (not illustrated) that is used to couple the channel housing 102 to one or more additional channel housings 102 to implement an N-stage dynamometer, as was alluded to above and will be described further below.

The channel housing 102 is also used to direct fluid into and out of the dynamometer 100, and to distribute fluid to the stator ring 104. As such, the channel housing 102 includes a fluid inlet port 312, one or more fluid outlet ports 314, and a flow channel 316. The fluid inlet port 312 is adapted to receive a flow of working fluid such as, for example, water. The fluid inlet port 312 is formed in the main body outer peripheral surface 304 and, as is shown most clearly in FIG. 6, extends through the channel housing main body 302, and into fluid communication with the flow channel 316.

The flow channel 316 is formed in the inner peripheral surface 308 of the channel housing main body 302, and preferably surrounds the main body opening 306. The flow channel 316 evenly distributes the fluid that flows into and through the inlet port 312 around the main body inner peripheral surface 308. As will be described in more detail further below, the fluid that is distributed by the flow channel 316 is supplied to a plurality of openings formed in the stator ring 104.

In the depicted embodiment, the channel housing 102 includes two fluid outlet ports 314, both of which are formed in the main body outer peripheral surface 304. The fluid outlet ports 314 are each configured as openings in flow walls 318 that are formed on, and extend perpendicularly from, both sides of the channel housing 102 proximate the outer peripheral surface 304, each of which define an open fluid region 320. The working fluid supplied to the dynamometer 100 flows around the perimeter of the flow wall 318 and exits the channel housing 102 via the outlet ports 314. The flow path between the channel housing fluid inlet port 312 and fluid outlet ports 314 will be described more fully below when fluid flow through the dynamometer 100 is described in more detail.

Turning now to FIGS. 7–12, the stator ring 104 will be described. The stator ring 104, as was mentioned above, is disposed at least partially within the channel housing opening 306, and includes an outer peripheral surface 702 and an opening 704 through the stator ring 104 that defines an inner peripheral surface 706. The outer peripheral surface 702 includes a plurality of fluid inlet ports 708, and the inner peripheral surface 706 includes a plurality of fluid outlet ports 710. A plurality of fluid flow channels 902, which are shown most clearly in FIGS. 9 and 11, each fluidly couple one of the stator ring fluid inlet ports 708 with one of the stator ring fluid outlet ports 710.

Figure 10:
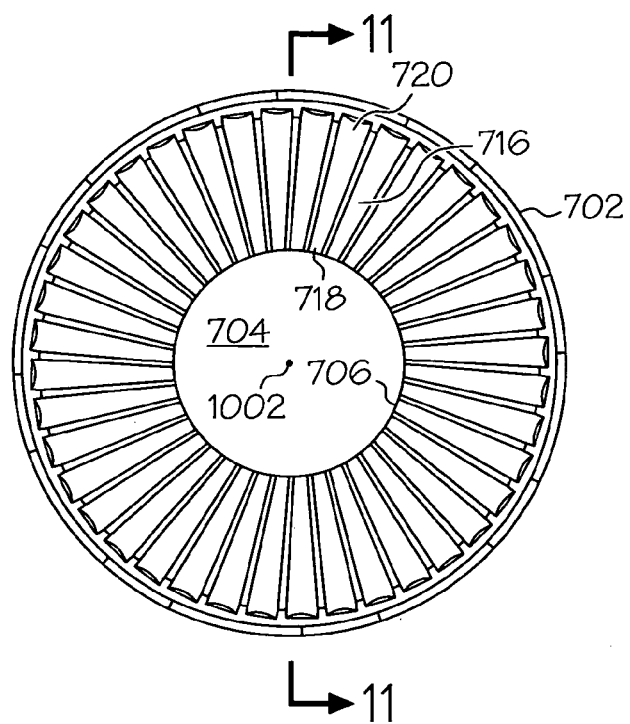
FIG. 10 is a front view of the stator ring.

The stator ring 104 additionally includes a first side 712 and a second side 714, both of which are disposed between the outer 702 and inner 704 peripheral surfaces. As shown most clearly in FIGS. 7 and 10, a plurality of stator vanes 716 are formed on the first 712 and second 714 sides of the stator ring 104. In a particular preferred embodiment, the stator vanes 716 are each configured to have a substantially conical cross sectional shape, and include an open first end 718 and a closed second end 720. The closed second end 720, in a preferred embodiment, is configured as a rounded fillet. The stator vanes 716 may also be configured, as shown in FIG. 10, such that each is radially offset from the center 1002 of the opening 704. It will be appreciated that various stator configurations could be used to implement the stator vanes 716, and that the depicted and described stator vane configuration is merely exemplary of a particular preferred embodiment. The purpose for the preferred stator vane configurations will be described more fully below.

Figure 11:
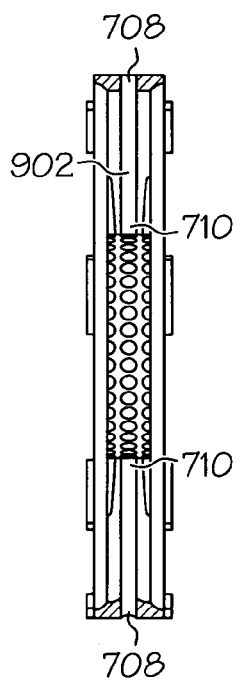
FIG. 11 is a cross section view of the stator ring taken along line 11-1 in FIG. 10.
Figure 11A:
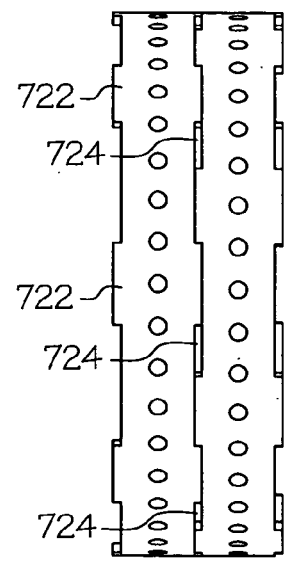
FIG. 11A is a side view of two stator rings disposed adjacent one another in a preferred configuration.
Figure 13:
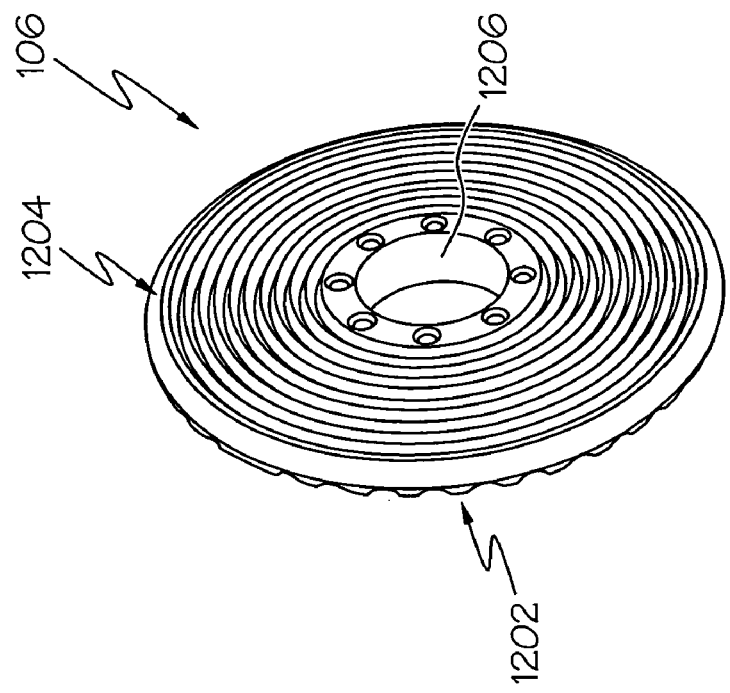
FIGS. 12 and 13 are front and back perspective views of an end rotor that may be used to implement the exemplary water dynamometer of FIGS. 1 and 2.

The stator ring 104 further includes a plurality of preferably evenly spaced-apart tabs 722 that extend perpendicularly from the stator ring first and second sides 712, 714 proximate the stator ring outer peripheral surface 702. As shown most clearly in FIGS. 7 and 8, each pair of tabs 722 forms an interposed slot 724. When the dynamometer 100 is configured in a multi-stage implementation, which is described in more detail further below, the tabs 722 on adjacent stator rings 104 interlock, and the slots 724 on adjacent stator rings 104 distribute fluid exiting the stator ring 104. This configuration is illustrated in FIG. 11A, which shows two stator rings 104 disposed adjacent one another, and with the tabs 722 interlocked in a preferred configuration.

Figure 14:
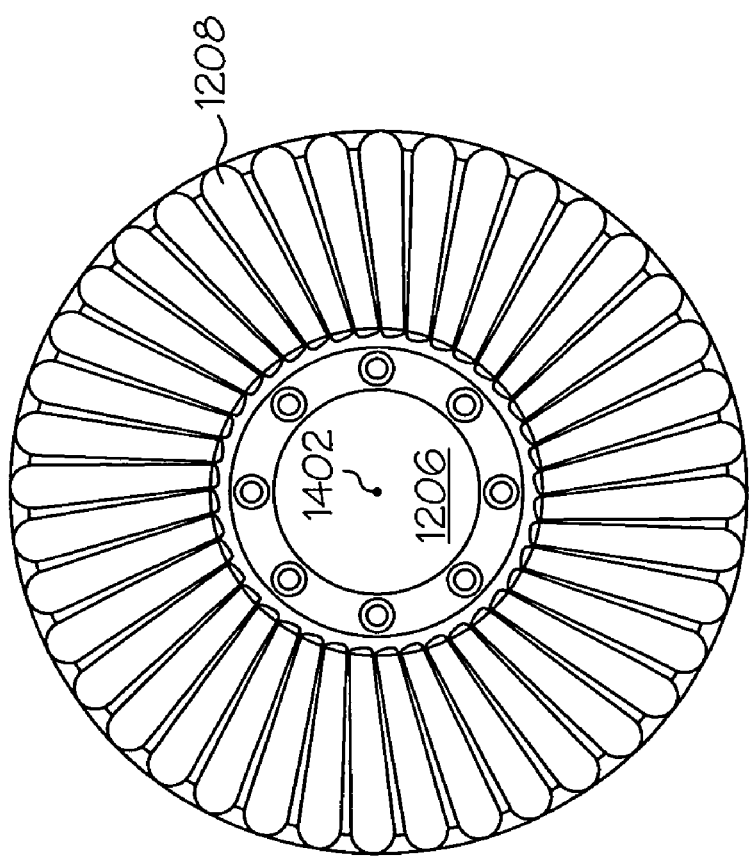

Turning now to FIGS. 12–15, the end rotors 106 will be described in more detail. The end rotors 106 are also partially disposed within the channel housing 102, one on either side of the stator ring 104. The end rotors 106 each include an inner side 1202, an outer side 1204, and an opening 1206 that extends between the two sides 1202, 1204. The end rotor inner side 1202, when the dynamometer 100 is assembled, is disposed adjacent one of the sides 712, 714 of the stator ring 104, and has a plurality of rotor vanes 1208 formed thereon. The rotor vanes 1208, similar to the stator vanes 716, are each configured to have a substantially conical cross sectional shape, but include a closed first end 1210 and an open second end 1212, which is opposite that of the stator vanes 716. Moreover, the second ends 1212 of each rotor vane 1208 are preferably rounded to substantially match the rounded fillet of the stator vane second ends 720. The rotor vanes 1208 may also be configured, as shown in FIG. 14, such that each is radially offset from the center 1402 of the opening 1206. It will be appreciated that either or both the stator vanes 716 and rotor vanes 1208 could be configured to be radially offset. In a preferred embodiment, however, the rotor vanes 1208 are so configured, and the stator vanes 716 are not.

In addition to the particular preferred configurations of the stator vanes 716 and rotor vanes 1208 described above, it will be appreciated that the stator 104 and end rotors 106 are preferably configured to have differing numbers of stator vanes 716 and rotor vanes 1208, respectively. Specifically, if the end rotors 106 are configured with N rotor vanes 1208, then the stator 104 is preferably configured with N+1 stator vanes 716. This relative number of stator 716 and rotor 1208 vanes ensures that the vanes 716, 1208 do not simultaneously pass each other during dynamometer operation. If this were to occur, small variations in torque measurement can result, which can adversely affect measurement accuracy.

Figure 12:
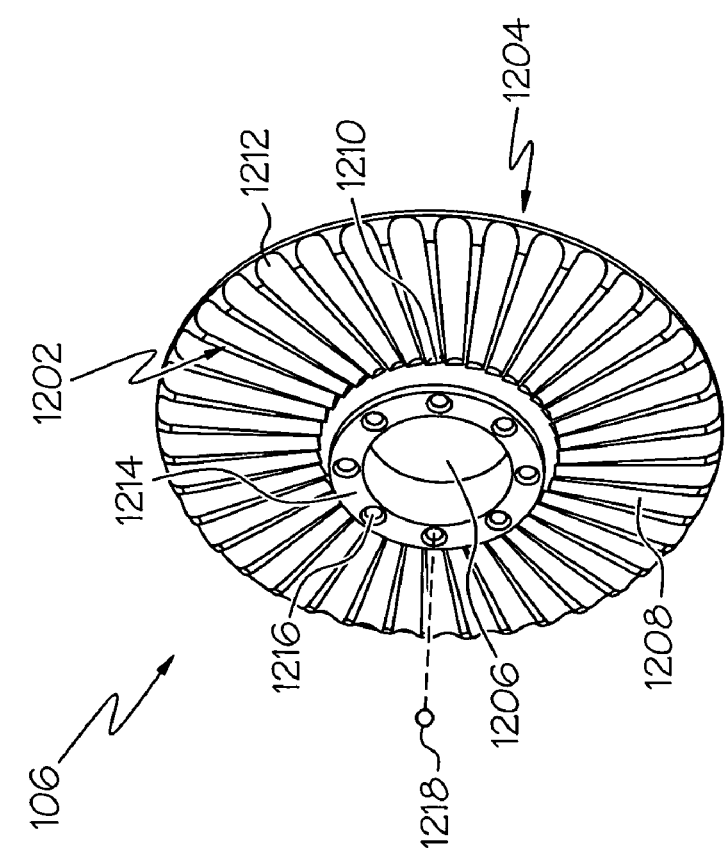
Figure 15:
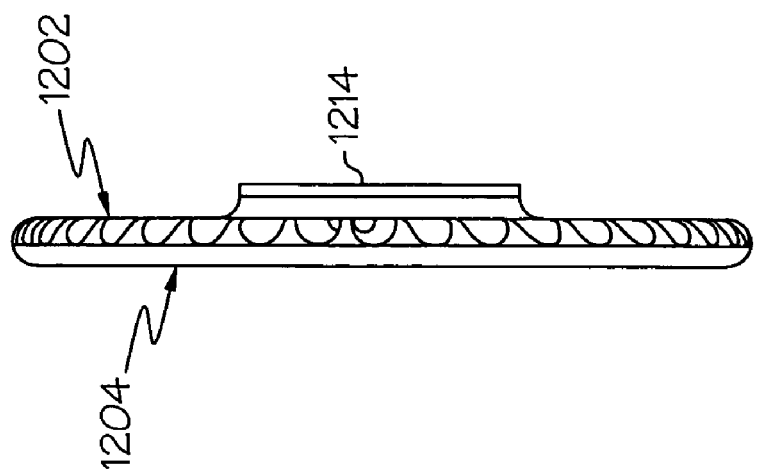
FIGS. 14 and 15 are front and side views of the end rotor shown in FIGS. 13 and 14.

In addition to the rotor vanes 1208, the end rotors 106 each include a hub 1214 that surrounds the opening 1206. The hub 1214 is substantially flush with the end rotor outer side 1204 but, as shown in FIGS. 12 and 15, extends perpendicularly away from the end rotor inner side 1202. The end rotor hub 1214 includes a plurality of openings 1216 that are evenly spaced around the circumference of, and extend through, the hub 1214. These openings 1216 are used to align and couple the end rotors 106 together, and to couple one of the end rotors 106 to the machine being tested. In a particular preferred embodiment, the end rotors 106 are aligned and coupled to one another using hardened steel balls 1218, which are disposed in collocated openings 1216 in the hubs 1214. It will be appreciated that this is merely exemplary of any one of numerous devices and methods of coupling and aligning the end rotors 106, and that other devices such as, for example, tie rods or threaded fasteners, could also be used.

The modular dynamometer 100 described above is configured in a single-stage implementation. Although the dynamometer 100 can be used in such an implementation, it will be appreciated that the modular dynamometer 100, as was previously noted, can be, and most preferably is, configured in an N-stage implementation, where N is two or more stages. Thus, before proceeding with a description of the operation of the modular dynamometer 100, and how it is interfaced to a machine under test in accordance with a particular preferred embodiment, a description of the dynamometer 100 configured in an N-stage implementation will be described. In doing so, reference should be made to FIGS. 16 and 17, which depict a perspective and exploded view, respectively, of an N-stage modular dynamometer 100.

When the modular dynamometer is configured in an N-stage implementation, the dynamometer includes two end stages 100-1 and 100-N, and (N-2) intervening power stages 100-2, 100-3, 100-4, . . . 1100-(N-1). It will thus be appreciated that a two-stage implementation (e.g., N=2) includes only two end stages and no intervening stages, a three-stage implementation (e.g., N=3) includes two end stages and one intervening power stage, a four-stage implementation (e.g., N=4) includes two end stages and two intervening power stages, and so on. As shown most clearly in FIG. 17, each of the end stages 100-1 and 100-N includes a channel housing 102, a stator ring 104, and an end rotor 106, and each intervening power stage 100-2, 100-3, 100-4, . . . 100-(N-1), includes a channel housing 102, a stator ring 104, and one or more intermediate rotors 1702 so that an intermediate rotor 1702 is disposed between each pair of adjacent stator rings 104. The channel housings 102, stator rings 104, and an end rotors 106 are preferably identical to those previously described, and will therefore not be further discussed. However, with reference to FIGS. 18–20

The intermediate rotor 1702 is configured similar to each of the end rotors 106, in that the intermediate rotor 1702 includes two sides—a first side 1704 and a second side 1706, an opening 1708 that extends between the two sides 1704, 1706, and a hub 1710 that surrounds the opening 1708. However, the intermediate rotor 1702 differs in that rotor vanes 1712 are formed on both the first and second sides 1704, 1706, and the hub 1710 extends perpendicularly away from the intermediate rotor 1702 on both the first and second sides 1704, 1706.

It will be appreciated that the rotor vanes 1712 formed on the intermediate rotor 1702 are substantially identical in number and configuration to the rotor vanes 1208 formed on the end rotors 106. As such, a description of the rotor vanes 1712 will not be repeated. The intermediate rotor hub 1710, similar to the end rotor hub 1310, includes a plurality of openings 1714 that are evenly spaced around the circumference of, and extend through, the hub 1710. Each of these openings 1714 is collocated with one of the openings 1212 on each end rotor 106, and are used to align and couple the intermediate rotors 1702 to one another and to the end rotors 106, as appropriate. As with the single-stage implementation, hardened steel balls 1214 are preferably used to align and couple the intermediate rotors 1702 and end rotors 106, although various other devices could be used.

Figure 21:
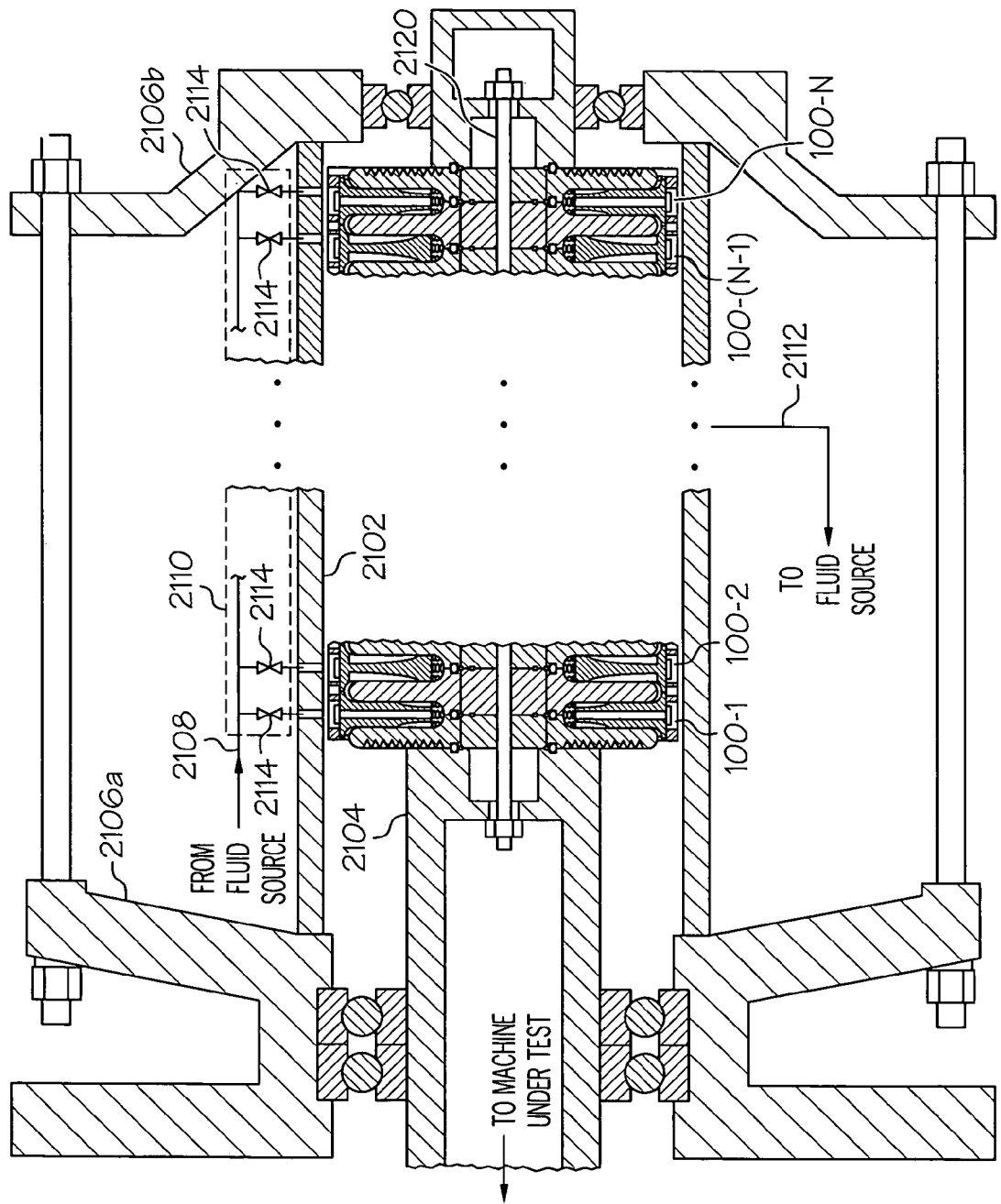
FIG. 21 is a simplified cross section view of the exemplary multi-stage water dynamometer of FIGS. 16 and 17 disposed with in a housing and coupled to mounting hardware.

Having described the modular water dynamometer 100 configured in both a single-stage and an N-stage implementation, a brief description of how the modular water dynamometer 100 is interfaced to a fluid supply system, and to a machine to be tested, will now be provided. It will be appreciated that this description will be based on the modular water dynamometer 100 being configured in an N-stage implementation. With reference first to FIG. 21, it is seen that the modular water dynamometer 100 is preferably disposed within a housing 2102, and is coupled to an engine under test via a shaft assembly 2104, and two bearing end blocks 2106—a first bearing end block 2106a, and a second bearing end block 2106b. Preferably, the modular water dynamometer 100, and the various components that are about to be described, are configured to be coupled to a machine under test 2202 in a cantilever manner, as shown schematically in FIG. 22.

Returning once again to FIG. 21, the housing 2102 is preferably coupled, or adapted to be coupled, to a fluid supply conduit 2108 via a fluid inlet manifold 2110, and a fluid discharge conduit 2112. The fluid supply and discharge conduits 2108, 2112 are each adapted to couple to a working fluid source (not illustrated), such as a water source, and to respectively receive a flow of working fluid from, and return the flow of working fluid to, the working fluid source. The fluid inlet manifold 2110 includes a plurality of inlet valves 2114 that are used to direct the working fluid from the fluid supply conduit 2108 to selected ones of the stages 100-1, 100-2, . . . 100-N. The working fluid discharged from each of the stages 100-1, 100-2, . . . 100-N then exits the housing 2102 and enters the fluid discharge conduit 2112 for return to the fluid source. It will be appreciated that this arrangement, together with the modular configuration of the water dynamometer 100, allows each of the stages 100-1, 100-2, . . . 100-N to be operated independently. In other words, as was previously alluded to, to be individually activated and deactivated. More specifically, the flow of working fluid to each individual stage 100-1, 100-2, . . . 100-N can be controlled via the individual inlet valves 2114 in the manifold 2110. As such, the modular water dynamometer 100 can be used to zero in on desired torque test loads during machine testing, by simply shutting off the flow of fluid to selected stages 100-1, 100-2, . . . 100-N. It will be appreciated that this, if desired, can be done "on-the-fly" during machine testing.

The shaft assembly 2104, at least in the depicted embodiment, includes two end sections, an input shaft 2116 and an end shaft 2118. The input shaft 2116 is adapted to be coupled at one end to a machine under test (not shown), and is adapted to be coupled, in a non-sealing manner, at its opposite end to one of the end sections 100-1 of the modular water dynamometer 100. The end shaft 2118 is adapted to be coupled, in a non-sealing manner, at one end to the other end section 100-N of the modular water dynamometer, and its other end is free. Preferably, the input shaft 2116 and end shaft 2118 are each coupled to the dynamometer 100 using the same hardened steel balls 1214 that are used to couple each of the rotors 106, 1702 together. Thus, the end rotors 106 and intermediate rotors 1702 are not individually coupled to a shaft that extends through the dynamometer 100. Rather, the coupled rotors 106, 1702 act as the shaft for the dynamometer 100. The input shaft 2116 and end shaft 2118 are shown coupled to one another via, for example, a threaded tie-rod 2120; however, this is merely exemplary of a particular preferred embodiment and the tie-rod 2120 or other coupling device need not be included.

The input shaft 2116 and end shaft 2118 are each rotationally mounted in the first bearing end block 2106a and the second bearing end block 2106b, respectively. To do so, a first bearing assembly 2122 is mounted within the first bearing end block 2106a, and a second bearing assembly 2124 is mounted within the second bearing end block 2106b. In the depicted embodiment, the first bearing assembly 2122 is a duplex bearing assembly, and the second bearing assembly 2124 is a single bearing assembly. It will be appreciated that this is merely exemplary of a particular preferred embodiment, and that either or both of the bearing assemblies 2122, 2124 could be duplex bearing assemblies, or single bearing assemblies.

Figure 22:
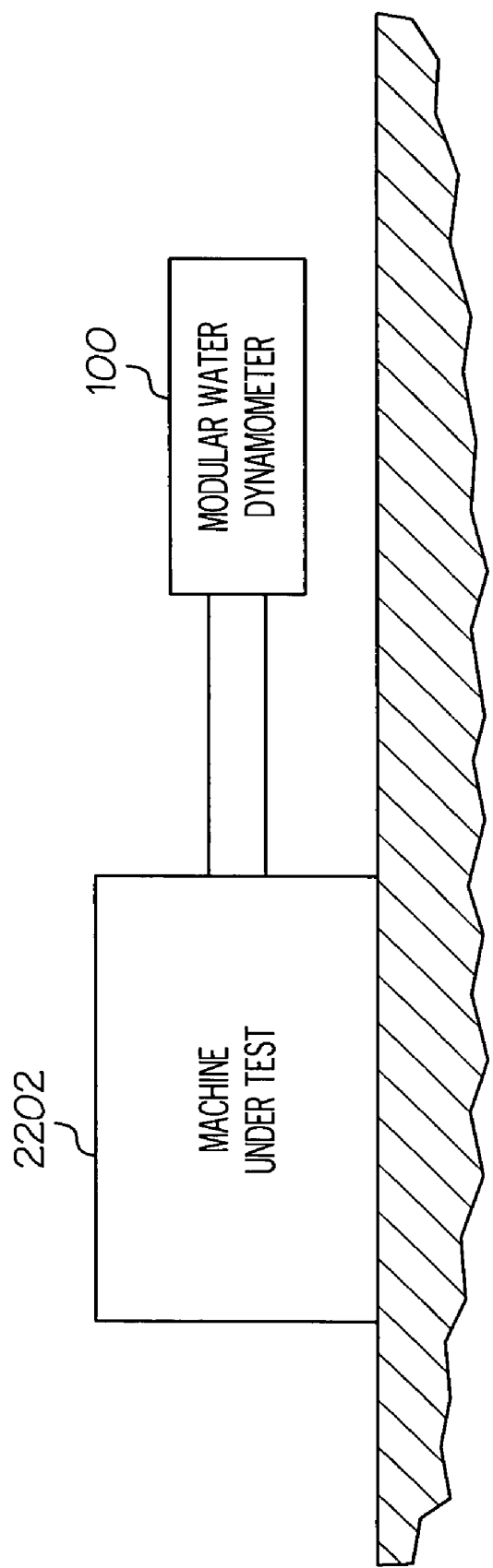
FIG. 22 is a simplified schematic representation of a machine coupled to a modular water dynamometer according to an embodiment of the present invention.

When the modular water dynamometer 100 is configured as shown in FIG. 21, and is coupled to a machine under test 2202 as shown in FIG. 22, the machine 2202 may be tested by supplying working fluid to a desired number of stages 100-1, 100-2, . . . 100-N of the modular water dynamometer 100, to achieve a desired load on the machine 2202. As the working fluid flows into and through each of the selected stages 100-1, 100-2, . . . 100-N, the work done on the working fluid by each stage 100-1, 100-2, . . . 100-N exerts a load on the machine 2202. For completeness of description and understanding, a description of the flow of working fluid through a single stage of the modular water dynamometer 100 will now be provided.

When a working fluid is directed into the channel housing fluid inlet 312, the fluid flows through the channel housing flow channel 316, and into the stator ring fluid inlet ports 708. The fluid entering the stator ring fluid inlet ports 708 flows into and through the stator ring fluid flow channels 902, and out the stator ring fluid outlet ports 710. The fluid that flows out of the stator ring fluid outlet ports 710 is drawn outwardly to the first and second sides 712, 714 of the stator ring 104 by the adjacent rotors 106, 1702, which also function as centrifugal pump impeller to pump the working fluid through the dynamometer 100. It will be appreciated that the adjacent rotors may be an end rotor 106 and an intermediate rotor 1702, two intermediate rotors 1702, or two end rotors 106, depending on whether the dynamometer is configured in a single-stage or multi-stage implementation.

The centrifugal pumping action of the rotors 106, 1702 expels the working fluid radially outwardly. As the fluid travels outwardly, and between the stator vanes 716 and rotor vanes 1208, 1712, a load is imparted on the machine 2202 under test. When the fluid reaches the outer peripheral edge of the rotor 106, 1702, it exits the stator 104 via the stator slots 724 and flows into the open flow regions 320 of the channel housing 102. The fluid flows through the flow region 320, and exits the channel housing 102 via the fluid outlet ports 314.

In each of the above described embodiments, and in the description of the fluid flow through one stage of the modular water dynamometer 100, the relative location of the channel housing 102 and stator ring 104 in an assembled stage were depicted and described such that the stator ring fluid inlet ports 708 are in fluid communication with the channel housing flow channel 316. It will be appreciated, however, that this is merely exemplary of one particular configuration. Indeed, in another exemplary configuration, each stage is configured such that the stator ring fluid inlet ports 708 are in fluid communication with the flow regions 320 of two channel housings 102. In such a configuration, the previously described channel housing fluid inlet port 312 is used the fluid outlet port, and the previously described channel housing fluid outlet port 314, is now the inlet port.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A water dynamometer, comprising:
a channel housing having a fluid inlet, a fluid outlet, and a flow channel formed therein, the flow channel fluidly coupling the fluid inlet to the fluid outlet;
a stator ring disposed at least partially within the channel housing and having a first side, a second side, an outer peripheral surface, and an inner peripheral surface, the stator ring outer peripheral surface having a plurality of fluid inlet ports in fluid communication with the channel housing fluid inlet port, and the stator ring inner peripheral surface having a plurality of fluid outlet ports in fluid communication with the stator ring fluid inlet ports;

a first end rotor and a second end rotor disposed adjacent the stator ring first side and second side, respectively, each end rotor including a plurality of rotor vanes disposed on a surface thereof and in fluid communication with the fluid outlet ports of the stator ring inner peripheral surface.

2. The dynamometer of claim 1, further comprising:

a plurality of stator vanes disposed on the stator ring first and second sides.

3. The dynamometer of claim 2, wherein each of the stator vanes disposed on the stator ring first side are at least partially offset from each of the stator vanes disposed on the stator ring second side.

4. The dynamometer of claim 2, wherein each of the stator vanes includes one or more substantially rounded edges.

5. The dynamometer of claim 2, wherein each of the stator vanes has a substantially conical cross section.

6. The dynamometer of claim 5, wherein:

each of the stator vanes has an open end disposed proximate the stator ring inner peripheral surface; and each of the stator vanes has closed end disposed proximate the stator ring outer peripheral surface.

7. The dynamometer of claim 6, wherein the closed end of each stator vane is configured as a rounded fillet.

8. The dynamometer of claim 2, wherein:

the stator ring inner peripheral surface forms a central opening through the stator ring, the central opening having at least a central point; and each of the stator vanes is radially offset from the central point of the stator ring central opening.

9. The dynamometer of claim 2, further comprising:

a plurality of tabs extending substantially perpendicular from the stator ring first and second sides proximate the stator ring outer peripheral surface, each pair of adjacent tabs forming an interposed slot.

10. The dynamometer of claim 1, wherein the first and second end rotors are each adapted to couple to a shaft to receive a rotational drive force therefrom.

11. The dynamometer of claim 1, wherein the rotor vanes each include one or more substantially rounded edges.

12. The dynamometer of claim 1, wherein each of the rotor vanes has a substantially conical cross section.

13. The dynamometer of claim 12, wherein:

each of the rotor vanes has an open end disposed proximate the end rotor outer peripheral surface; and each of the rotor vanes has closed end disposed proximate the end rotor inner peripheral surface.

14. The dynamometer of claim 1, wherein:

the first and second end rotors each include a central opening that extends therethrough, the central opening having at least a central point; and each of the rotor vanes is radially offset from the central point of its corresponding end rotor opening.

15. The dynamometer of claim 1, wherein the stator ring inner peripheral surface forms an opening between the stator ring first and second sides, and wherein the first and second end rotors each include:

a hub section that extends at least partially into the opening;

a plurality of openings formed in each hub section; and a plurality of rotor alignment devices disposed within each hub section, each rotor alignment device configured to couple the first and second end rotor hubs together and to align the hubs to one another.

16. The dynamometer of claim 15, wherein each rotor alignment device comprises a hardened steel ball.

17. The dynamometer of claim 1, wherein the channel housing comprises:

a main body having a first side, a second side, an outer peripheral surface and opening through the main body that forms an inner peripheral surface, wherein the flow channel is formed in the main body inner peripheral surface.

18. The dynamometer of claim 16, wherein:

the channel housing fluid inlet extends between the flow channel and the main body outer peripheral surface.

19. The dynamometer of claim 17, further comprising:

a plurality of flow walls, each flow extending perpendicular from one of the channel housing main body first and second sides, wherein the channel housing fluid outlet port extends through at least one of the flow walls.

20. A modular water dynamometer, comprising:

two or more channel housings coupled together, each channel housing having a fluid inlet, a fluid outlet, and a flow channel formed therein, the flow channel in each fluid channel housing fluidly coupling its associated fluid inlet to its associated fluid outlet;

two or more stator rings, each stator ring disposed at least partially within at least one of the channel housings and having a first side, a second side, an outer peripheral surface, and an inner peripheral surface, the outer peripheral surface of each stator ring having a plurality of fluid inlet ports in fluid communication with its associated channel housing fluid inlet, and the inner peripheral surface of each stator ring having a plurality of fluid outlet ports in fluid communication with the fluid inlet ports of its associated stator ring outer peripheral surface;

one or more intermediate rotors, each intermediate rotor disposed between two of the stator rings;

a first end rotor disposed adjacent the first side of a first one of the stator rings; and a second end rotor disposed adjacent the second side of a second one of the stator rings.

21. The dynamometer of claim 20, further comprising:

a plurality of stator vanes disposed on the first and second sides of each stator ring.

22. The dynamometer of claim 21, wherein each of the stator vanes disposed on the first side of each stator ring are at least partially offset from each of the stator vanes disposed on the second side of each stator ring.

23. The dynamometer of claim 21, wherein each of the stator vanes includes one or more substantially rounded edges.

24. The dynamometer of claim 21, wherein each of the stator vanes has a substantially conical cross section.

25. The dynamometer of claim 24, wherein:

each of the stator vanes has an open end disposed proximate its corresponding stator ring inner peripheral surface; and each of the stator vanes has closed end disposed proximate its corresponding stator ring outer peripheral surface.

26. The dynamometer of claim 25, wherein the closed end of each stator vane is configured as a rounded fillet.

27. The dynamometer of claim 21, wherein:
the inner peripheral surface of each stator ring forms a central opening therethrough, the central opening having at least a central point; and
the stator vanes of each of stator ring are radially offset from the central point of its corresponding stator ring central opening.

28. The dynamometer of claim 21, further comprising:
a plurality of tabs extending substantially perpendicular from the first and second sides of each stator ring proximate its corresponding outer peripheral surface, each pair of adjacent tabs on a stator ring forming an interposed slot.

29. The dynamometer of claim 28, wherein one or more tabs on adjacent stator rings contact one another.

30. The dynamometer of claim 20, wherein the first and second end rotors are each adapted to couple to a shaft to receive a rotational drive force therefrom.

31. The dynamometer of claim 20, further comprising:
a plurality of rotor vanes formed on the first and second end rotors, and on each intermediate rotor, each rotor vane in fluid communication with the fluid outlet ports of an adjacent stator ring.

32. The dynamometer of claim 31, wherein the rotor vanes each include one or more substantially rounded edges.

33. The dynamometer of claim 31, wherein each of the rotor vanes has a substantially conical cross section.

34. The dynamometer of claim 31, wherein:
the first end rotor, the second end rotor, and each intermediate rotor each include an outer peripheral surface and an inner peripheral surface;
each of the rotor vanes has an open end disposed proximate the corresponding outer peripheral surface; and
each of the rotor vanes has closed end disposed proximate the corresponding inner peripheral surface.

35. The dynamometer of claim 31, wherein:
the first end rotor, the second end rotor, and each intermediate rotor each include a central opening that extends therethrough, the central opening having at least a central point; and
each of the rotor vanes is radially offset from the central point of its corresponding rotor opening.

36. The dynamometer of claim 20, wherein:
each stator ring inner peripheral surface forms an opening between the stator ring first and second sides,
the first and second end rotors each include a hub section that extends at least partially into the opening of one stator ring; and
each intermediate rotor includes a hub section that extends at least partially into the openings of two adjacent stator rings.

37. The dynamometer of claim 36, further comprising:
a plurality of openings formed in each hub section; and
a plurality of rotor alignment devices disposed within each hub section, each rotor alignment device configured to couple the first end rotor hub, the second end rotor hub, and the intermediate rotor hubs together and to align the hubs to one another.

38. The dynamometer of claim 37, wherein each rotor alignment device comprises a hardened steel ball.

39. The dynamometer of claim 20, wherein each channel housing comprises:
a main body having a first side, a second side, an outer peripheral surface and opening through the main body that forms an inner peripheral surface,
wherein each flow channel is formed in the corresponding main body inner peripheral surface.

40. The dynamometer of claim 39, wherein:
each channel housing fluid inlet extends between the corresponding flow channel and corresponding main body outer peripheral surface.

41. The dynamometer of claim 40, wherein each channel housing further comprises:
a plurality of flow walls, each flow extending perpendicular from one of the channel housing main body first and second sides,
wherein the channel housing fluid outlet port extends through at least one of the flow walls.

42. A modular water dynamometer, comprising:
a housing;
two or more channel housings disposed within the housing and coupled together, each channel housing having a fluid inlet, a fluid outlet, and a flow channel formed therein, the flow channel in each fluid channel housing fluidly coupling its associated fluid inlet to its associated fluid outlet;
two or more stator rings disposed within the housing, each stator ring disposed at least partially within at least one of the channel housings and having a first side, a second side, an outer peripheral surface, and an inner peripheral surface, the outer peripheral surface of each stator ring having a plurality of fluid inlet ports in fluid communication with its associated channel housing fluid inlet, and the inner peripheral surface of each stator ring having a plurality of fluid outlet ports in fluid communication with the fluid inlet ports of its associated stator ring outer peripheral surface;
one or more intermediate rotors, each intermediate rotor disposed within the housing between two of the stator rings;
a first end rotor disposed adjacent the first side of a first one of the stator rings, and disposed at least partially within the housing;
a second end rotor disposed adjacent the second side of a second one of the stator rings, and disposed at least partially within the housing;
two or more fluid supply conduits coupled to the housing, each fluid supply conduit having a fluid inlet port and a fluid outlet port, the fluid supply conduit inlet ports each adapted to couple to a working fluid source, the fluid supply conduit outlet ports each in fluid communication with one or more stator ring fluid inlet ports; and
a valve mounted on each fluid supply conduit, each valve moveable between an open position and a closed position, whereby working fluid from the working fluid source is selectively supplied to each stator ring fluid inlet port.

* * * * *